United States Patent [19]

Rose

[11] 4,343,821

[45] * Aug. 10, 1982

[54] PROCESS FOR PREPARING MEAT PRODUCTS HAVING REDUCED SHRINKAGE

[76] Inventor: Peter W. Rose, R.R. 3 Covered Bridge Rd., South Barrington, Ill. 60010

[ * ] Notice: The portion of the term of this patent subsequent to Apr. 28, 1998, has been disclaimed.

[21] Appl. No.: 182,329

[22] Filed: Aug. 28, 1980

Related U.S. Application Data

[63] Continuation-in-part of Ser. No. 165,850, Jul. 7, 1980, Pat. No. 4,276,313, which is a continuation-in-part of Ser. No. 139,795, Apr. 14, 1980, Pat. No. 4,264,632, which is a continuation-in-part of Ser. No. 129,727, Mar. 12, 1980, Pat. No. 4,264,631.

[51] Int. Cl.$^3$ .......................... A23B 4/02; A23L 3/32
[52] U.S. Cl. ..................................... 426/247; 204/131; 426/244; 426/246; 426/264; 426/281; 426/282; 426/413; 426/524; 426/641; 426/646; 426/652
[58] Field of Search .............. 426/129, 237, 244, 246, 426/247, 264, 281, 282, 284, 641, 646, 649, 652, 413, 518, 519, 524; 204/98, 131

[56] References Cited

U.S. PATENT DOCUMENTS

| | | | |
|---|---|---|---|
| 267,684 | 11/1882 | Fowler | 426/246 |
| 657,258 | 9/1900 | Washburn | 426/246 |
| 705,367 | 7/1902 | Lincoln | 426/246 X |
| 760,173 | 5/1904 | Ball | 426/246 |
| 930,772 | 8/1909 | Lincoln | 426/246 |
| 1,044,201 | 11/1912 | Lincoln | 426/237 |

*Primary Examiner*—Arthur L. Corbin
*Attorney, Agent, or Firm*—Dressler, Goldsmith, Shore, Sutker & Milnamow, Ltd.

[57] ABSTRACT

A meat product having reduced shrinkage upon cooking is prepared by treating meat with an aqueous solution of an edible chloride salt present at at least about 0.2 molal. The solution is first electrolyzed by passage of a direct current through it to prepare an electrolyzed moisturizing solution having moisturizing activity. The electrolyzed moisturizing solution is cooled to a temperature of no higher than about 30° F., while maintaining its moisturizing activity, to form an electrolyzed moisturizing composition. While maintaining moisturizing activity, the electrolyzed moisturizing composition and meat are thereafter combined and maintained in contact until moisturized meat is formed, and the moisturized meat is then recovered.

55 Claims, No Drawings

PROCESS FOR PREPARING MEAT PRODUCTS HAVING REDUCED SHRINKAGE

DESCRIPTION

CROSS-REFERENCE TO RELATED APPLICATIONS

This is a continuation-in-part of copending patent application Ser. No. 165,850, filed on July 7, 1980, now U.S. Pat. No. 4,276,313, which is a continuation-in-part of patent application Ser. No. 139,795, filed on Apr. 14, 1980, now U.S. Pat. No. 4,264,632, which, in turn, is a continuation-in-part of copending patent application Ser. No. 129,727, filed on Mar. 12, 1980, now U.S. Pat. No. 4,264,631.

TECHNICAL FIELD

The present invention relates to a process for preparing meat food products having reduced shrinkage upon processing, particularly after cooking, which utilizes a cooled electrolyzed moisturizing composition to moisturize the meat.

BACKGROUND ART

Water constitutes the largest portion, by weight, of a food animal. From about the time such an animal is slaughtered, its carcass begins to lose water, dry out or shrink. Shrinkage or weight loss, which begins on slaughtering, continues not only through the refrigeration and butchering steps in meat processing, but also during cooking. As a result of shrinkage, the meat generally becomes somewhat tougher and can be harder to butcher. As a further result of this shrinkage, the meat provider obtains a lesser amount of product to sell, and that product is of diminished quality. Because of shrinkage, the meat purchaser receives an even smaller amount of product to cook, and cooking shrinkage results in a still smaller amount of cooked material served for ultimate consumption.

Several processes are known in the art which are said to minimize or reverse carcass shrinkage. Among these are processes in which meat is sprayed or fogged with an aqueous solution, or in which meat is dipped into a water bath. In addition, it is well known to use aqueous curing compositions or pickles which assist in reducing meat shrinkage while preserving and flavoring the meat.

In some anti-shrink techniques in which water is added back to the carcass, or its meat, to return the water content to a natural level, it is found that such water is usually not held firmly therein and is lost again on processing. For example, it is known and usual in pork sausage manufacture to mix 1,000 pounds of pork chunks with up to 31 pounds of a brine solution containing 30 pounds of water and one pound of salt (sodium chloride). About one minute or more may be required for the pork chunks to become moisturized by sorbing the brine. Then, during further processing, when the moisturized pork chunks are ground, shrinkage again is manifest in that some water is lost from the ground, moisturized chunks, thereby lowering the yield of ground meat produced. When sausages containing 60 weight-% lean—40 weight-% fat ground pork are prepared by this known and usual method, and are cooked with continual rolling at a temperature of about 340°–350° F. for 10 minutes under standard conditions, it is observed that they shrink to about 38–43% of their precooked weight, or maintain about 62–57% of that weight. In addition, air pockets are often noted between the sausage casing and the meat therewithin, and the sausages curl.

In the curing arts, meats, particularly certain cuts of beef and pork, are cured by contacting the meat with aqueous curing solutions or dispersions, and maintaining that contact for a time sufficient to cure the meat. Methods for contacting the meat with aqueous curing solutions called aqueous pickle solutions or pickles include bathing the meat by total or partial submersion in the pickle, injecting the pickle into the meat through available indigenous vasculature, or by injecting the pickle into the meat through hollow needles that penetrate through the meat's surface. Each of these methods is frequently used alone, but more frequently, one or more of the aforementioned methods is used in conjunction with the others. In most common practice, pickle is injected into the meat at random locations, and the meat bathed with pickle by submersion therein. Bathing by submersion alone, or injection via available veins or arteries, are usually too inefficient for today's productivity requirements.

Aqueous pickle solutions are primarily composed of water to which salts, flavorants and preservatives are added. Thus, aqueous pickle solutions may contain edible chlorides such as sodium, potassium or calcium chloride, edible phosphates such as sodium pyrophosphate, tripolyphosate, hexametaphosphate, disodium phosphate and the like, sugars such as sucrose, spices, edible gums, smoke distillates, and the like, as well as preservatives such as sodium nitrate and sodium nitrite.

Examination of pickling compositions known in the art reveals that polyvalent curing and buffering agents such as phosphate and carbonate salts frequently constitute an important portion of the pickle solution. The ranking by weight of importance of these salts in typical aqueous pickle solutions is normally third or fourth, after water, an edible chloride salt such as sodium chloride and a sugar such as sucrose or corn syrup. This is shown in U.S. Pat. Nos. 2,812,262; 3,028,246; 3,076,713; 3,215,540; 3,240,612 and 3,255,023.

One major problem with curing and preserving meat is shrinkage, since on going from its fresh state to the cured, cooked condition, the meat loses moisture, protein and fats. Shrinkage of about 20–25% of the original weight of the meat including the injected pickle solution is a common result for cured products after they are smoked and cooked. Thus, relative to the fresh product, the meat supplier again has less meat to sell, and the purchaser again has less meat to buy.

One of the principal purposes for the inclusion of phosphates, carbonates and similar polyvalent curing and buffering agents in aqueous pickle solutions is to help prevent shrinkage in the cured, cooked products. This expedient is taught in U.S. Pat. Nos. 3,028,246 and 3,215,540. For example, these patents teach that yields of cooked products cured with phosphate salt-containing pickle solutions may range from near 90% to greater than 100% by weight of the freshly deboned meat.

It is also known in the art that meat may be treated by placing the meat into an aqueous brine solution and passing an electric current therethrough. These treatments are shown in U.S. Pat. No. 267,684, No. 657,207, No. 705,367, No. 760,173, and No. 930,772. In each of these treatments, the meat is within the aqueous brine solution while the current is passed. These treatments are said to improve the rate of meat curing.

It would be beneficial to the meat product suppliers and the consuming public if shrinkage were reduced in meat products as sold and as used after cooking. It would also be beneficial if cured meat products could be produced in greater yield using pickle solutions similar to those already in use, or even at currently achievable yields, but by using pickle solutions from which some of the usual ingredients, such as phosphate salts, are omitted.

SUMMARY OF THE INVENTION

The present invention provides a process for the preparation of a meat food product with reduced shrinkage. By reduced shrinkage, it is meant that the meat loses a smaller amount of weight during processing and/or cooking than is usual at these steps.

The meat treating process entails the steps of providing meat and contacting the meat with a specially treated aqueous solution containing an edible chloride salt present at a concentration of at least about 0.2 molal (0.2 moles per 1000 grams of liquid water). Before the aqueous solution is contacted with the meat, direct electric current is passed through the aqueous solution at about 2 to about 20 amperes to prepare an electrolyzed moisturizing solution having moisturizing activity. The electrolyzed moisturizing solution is then cooled to a temperature of no more than about 30° F., while the solution maintains moisturizing activity, to form a moisturizing composition.

Thereafter, the moisturizing composition is combined with the meat to form an admixture while the moisturizing activity is maintained. In preferred practice, the admixture is formed with the moisturizing composition (a) in solid form; (b) as a slurry or slush of solid and liquid; or (c) after the solid portion has melted into a liquid. Additional, non-electrolyzed solution may also be combined with the meat.

Contact between the meat supply and moisturizing composition is maintained for a time period sufficient for the moisturizing composition to penetrate the meat, enhancing the moisture content thereof and forming moisturized meat. The moisturized meat is then recovered.

In my aforementioned previously filed applications, all of whose pertinent disclosures are hereby incorporated by reference, it is disclosed that the meat and electrolyzed moisturizing solution are to be combined and contacted after cessation of the current passage through the solution, using three tests to determine the point in time when contacting is to be effected: (1) while at least a certain amount of the solution added is retained by the meat after grinding or (2) while the pH of the electrolyzed moisturizing solution is at a specified, elevated value; or (3) within about 40 minutes after passage of direct current through the solution had ceased; each of these tests being indicia that the electrolyzed moisturizing solution has moisturizing activity. Thus, the solution, once electrolyzed, could not be stored for hours, let alone days or longer, nor could it be efficiently shipped, as its effectiveness would deteriorate with time.

It has now been found that if the electrolyzed solution is cooled to a temperature of no more than about 30° F. after the cessation of direct current passage therethrough, the solution's moisturizing activity may be maintained for a longer period of time than was heretofore thought possible. If the cooled moisturizing composition is frozen into a composition containing at least some solid, and preferably completely frozen into a solid, this frozen moisturizing composition will hold its effectiveness for weeks or months or possibly longer. Thus, preparation and storage for later use of relatively large quantities of moisturizing composition are now possible, as is shipment of the frozen moisturizing composition from one part of the country for use in another.

Several advantages of the use of electrolyzed solutions for reducing shrinkage in meat products are discussed in my aforementioned patent applications, and particularly in application Ser. No. 165,850, filed on July 7, 1980, and will therefore not be dealt with further herein.

DETAILED DESCRIPTION OF THE INVENTION

When practicing the present invention, the reduction in weight loss is manifest in all three dimensions of the meat subjected to treatment. As a consequence, the meat tends to retain its size and shape during processing, and more particularly during cooking. The process of this invention may be used to prepare both fresh and cured edible products having reduced shrinkage. It is emphasized that contrary to the practice of the prior art, the meat treated herein is not in electrical contact with the aqueous solutions while there is passage of an electrical current through those solutions.

The process of this invention can be practiced with the meat from a wide variety of animals. As used herein, the term "meat" includes the flesh of domestic and wild mammals, such as beef, pork, veal, venison, buffalo, and the like. In preferred practice, this flesh is pork or beef.

Pork will be used illustratively herein as it is a meat of great commercial importance. In addition, pork is also a useful exemplary meat inasmuch as pork products are sold fresh as well as cured and cooked, and in large cuts or as ground products.

An aqueous solution of an edible chloride salt such as sodium chloride or potassium chloride or calcium chloride is utilized in the present process. Sodium chloride is the preferred salt. It is to be understood, however, that in the examples hereinafter where sodium chloride is used as the edible salt, other edible salts can be substituted without adversely affecting the result.

An aqueous solution concentration of at least about 0.2 molal edible chloride salt to about a saturated solution of the edible chloride salt may be used in the present invention. As the aqueous solutions used herein are frozen in preferred practice, and increasing solute concentrations decrease the freezing point, it is understood that solutions having concentrations substantially less than saturation are preferred. More preferred concentrations of edible chloride salt will be discussed hereinbelow in conjunction with specifically discussed embodiments.

A direct electric current is passed through the aqueous, edible chloride salt solution to form an electrolyzed moisturizing solution. A current of about 2 to about 20 amperes is passed through the solution to prepare an electrolyzed moisturizing solution having moisturizing activity.

The electrolyzed moisturizing solution is then cooled to a temperature of no more than about 30° F. after the passage of the direct electric current has ceased, while maintaining the moisturizing activity, to form a moisturizing composition. In usual practice, the cooling should be accomplished within about 40 minutes of the cessation of current passage. In usual practice, this cooling is the initial phase of the freezing of the electrolyzed moisturizing composition discussed hereinbelow. However, this need not be the case, and so long as the electrolyzed moisturizing solution is cooled as above, and maintained at a maximum of about 30° F., it may be frozen at a later time, or used in its cooled state so long as its moisturizing activity is maintained. It is found that this cooling prevents or retards the deterioration of the electrolyzed moisturizing composition which would otherwise occur at higher temperatures. In preferred practice, the electrolyzed moisturizing solution is cooled as rapidly as possible to minimize any deterioration which might occur.

The electrolyzed moisturizing composition is then preferably frozen to form a moisturizing composition which is at least partially solid. Thus, the moisturizing composition may be totally solid or may have both solid and liquid phases present. In preferred practice, the electrolyzed moisturizing solution is frozen to form a totally solid moisturizing composition. While several means are known in the art for freezing, a blast freezer operating at a temperature of $-20°$ F., and whose air movement is about 10,000–15,000 cubic feet per minute (c.f.m), has been found particularly useful.

After formation of a moisturizing composition, such as that which is at least partially solid, that composition is combined with the meat to contact one with the other. The modes in which the meat and electrolyzed moisturizing composition are contacted and the physical form of the electrolyzed moisturizing composition at the time of initial contact may each be quite varied. As will be seen from the discussion hereinbelow, some of the modes of contacting and some physical forms of the electrolyzed moisturizing composition may not be compatible.

Several modes of combining meat and electrolyzed moisturizing composition known in the art illustratively include, among others, bathing the meat by total or partial submersion of large cuts, such as a loin, in the moisturizing composition; spraying, splashing or dipping the meat in the moisturizing composition; injecting the moisturizing composition into the meat via the indigenous vasculature, by piercing the meat with hollow needles and injecting the moisturizing composition through the needles and into the meat; and simply physically mixing chunks of meat with an amount of the moisturizing composition.

At the time of the initial contacting of the meat and moisturizing composition, that composition is preferably: (a) solid, or (b) a slurry or slush of solid and liquid, or (c) a liquid formed from the melting of the slurry or solid. Of course, the cooled, liquid, electrolyzed moisturizing solution (electrolyzed moisturizing composition) may be utilized within 40 minutes of the cessation of current passage as disclosed in my aforementioned application Ser. No. 165,850, filed on July 7, 1980, or thereafter as disclosed herein. Regardless of the form of the electrolyzed moisturizing composition, it is utilized while maintaining moisturizing activity.

Use of the solid, or slurry or slush of solid and liquid electrolyzed moisturizing composition are particularly preferred when the moisturizing composition is combined with meat chunks in the formation of ground meats, as in the production of sausages. Here, the frozen solid in either of forms (a) or (b) is in particulate form and typically has a particle size of about 1-inch on a side or smaller. Particles of this size are easily made from blocks of the frozen solid electrolyzed moisturizing composition by conventional ice chipping or flaking machines.

The use of an electrolyzed moisturizing solution heated to a temperature of about 100° F. to about 130° F. was discussed in my beforementioned application Ser. No. 165,850, filed on July 7, 1980 as being helpful in aiding the rapid take-up of the electrolyzed moisturizing solution by meat chunks when sausages are prepared. That usage notwithstanding, it is now found that when meat chunks are combined with the comminuted, particulate, electrolyzed moisturizing composition of this invention, meat penetration or take-up of the electrolyzed moisturizing composition occurs even more rapidly. This present use also eliminates the use of energy to heat the electrolyzed solution of my previous invention, and also cuts down on the amount of ice needed to keep the meat cool after the addition of a heated, electrolyzed solution used in that invention. In addition, some workers in the art utilize particulate dry ice (carbon dioxide) to help chill the meat prior to and during the grinding step, and the amount of dry ice so utilized may also be reduced by the present use of the comminuted, particulate electrolyzed moisturizing composition. In one instance, the amount of dry ice was cut by about one-third.

The melted, electrolyzed moisturizing composition is particularly useful when meat is injected with the electrolyzed moisturizing composition. The difficulties in injecting the electrolyzed moisturizing composition in a solid form of the above dimensions are readily apparent. However, some solid particles may be present in an electrolyzed moisturizing composition which is to be injected into the meat, so long as they are of small enough dimension not to clog the system.

Contact between the meat and the electrolyzed moisturizing composition is maintained for a time sufficient to form moisturized meat. Moisturized meat is meat whose moisture content is enhanced over that naturally present. The amount of moisture enhancement may vary widely among the various meat food products produced by the process of this invention. The time period of contact may also have a broad range before the next process step such as recovery, grinding, curing or the like is initiated. For example, the contacting time period may be a matter of minutes, as when ground meat product is prepared, to one or more days when cured meats are prepared.

After the meat is moisturized and further processed as desired, it is recovered for use. For example, the moisturized meat may be packaged and sold as such, ground to form the basis for various sausages, allowed to cure for a requisite time before being cooked, smoked, or sold in a cured form only, or the like.

In one embodiment of the process of the present invention, ground meat having reduced shrinkage is prepared. As stated hereinbefore, pork will be used as exemplary of the meat used in the process.

The pork used for grinding is frequently prepared from meat trimmings obtained by butchering various cuts of meat. When used in the instant process, a supply of this meat is provided in the form of chunks which are preferably about 1 to about 5 inches on a side. Larger chunks may be also used, such as those pieces up to about 8 inches or more on a side. Additionally, smaller chunks may also be used, such as roughly ground meat like that which has been ground through a grinding face plate having about ⅜ inch apertures.

The edible chloride salt is preferably present in the aqueous solution of this embodiment at a concentration of about 0.25 to about 1.25 molal. Converting molalities to percentages by weight of sodium chloride, about 1% by weight of aqueous solution to a saturated sodium chloride solution are useful concentrations herein, while use of sodium chloride in an amount of about 1% to about 5% by weight of the aqueous solution is preferred.

Another way to characterize the desired edible chloride salt concentration is as a function of the weight of meat treated. Thus, it is found that a concentration of about 0.05% to about 0.4% by weight of the total meat supplied in the process is suitable. An exemplary concentration of sodium chloride present in the aqueous solution useful in this invention is about 0.1% by weight of the total meat supplied in the process.

It is also noted that the electrolyzed moisturizing composition need not supply all of the water and edible chloride salt used in the moisturizing process. Thus, it is found that the electrolyzed moisturizing composition may contribute only a portion, e.g. about 25 weight percent, of the weight of composition used for moisturizing, while the remaining about 75 weight percent of that composition is provided by admixture of an additional aqueous composition such as water, an aqueous solution of an edible chloride salt or the like, so long as the total composition used for moisturizing the meat meets the moisturizing activity criteria, discussed hereinafter, at the time of contacting the meat. Similarly, the electrolyzed moisturizing solution may be prepared in a first amount and at a first concentration of edible chloride salt and have a second amount of non-electrolyzed solution added thereto to provide an electrolyzed solution of the first concentration of chloride salt or at a second concentration thereof, again so long as the resulting electrolyzed solution meets the criteria discussed hereinafter. The two types of solution may be combined with the meat following premixing, concurrently or substantially simultaneously.

A small amount of a sugar such as sucrose or other flavorant may also be present in the aqueous solution at a concentration sufficient to mask the flavor of the edible chloride salt. A useful amount of sucrose for this purpose has been found to be about 0.01% by weight of the total meat supplied.

For the instant embodiment, the amperage of the direct electric current passed through the aqueous solution of edible chloride salt, while being broadly about 2 to about 20 amperes in this embodiment, is preferably about 5 to about 15 amperes, and more preferably about 5 to about 10 amperes. The voltage during electrolysis may be about 1 to about 20 volts, and is preferably less than about 5 volts.

As stated hereinbefore, the direct current is passed through the solution to prepare an electrolyzed moisturizing solution having moisturizing activity. Three criteria have been found useful for determining the duration of direct current passage through the aqueous solution to form the electrolyzed moisturizing solution having moisturizing activity. One criterion is based upon a performance standard of retention of the electrolyzed moisturizing solution in the meat after the meat is ground. The second and third criteria are based upon measurements which may be more easily made; i.e., the number of coulombs which have passed through the aqueous solution, and the change in pH value of certain aqueous solutions upon electrolysis.

Using the performance criterion, an exemplary sodium chloride solution may be electrolyzed at least until the time at which at least about 50 percent by weight of the electrolyzed moisturizing solution, when combined with the meat chunks at about 3 percent by weight of those meat chunks, is retained after those meat chunks are ground. Stated slightly differently, current is passed through the solution in an amount to provide an electrolyzed moisturizing solution at least one-half of which is retained by the meat chunks after grinding when the electrolyzed moisturizing solution is combined with the meat chunks before grinding in an amount of about 3 percent by weight thereof. In more preferred practice, passage of current through the solution is continued until about 60% to about 80% by weight, and most preferably more than about 80% by weight of the electrolyzed moisturizing solution, when combined with the meat chunks at about 3% by weight of the meat chunks, is retained after the meat chunks are ground.

A second criterion for the preparation of an electrolyzed moisturizing solution is based upon the passage of a direct current of about 2 to about 20 amperes, preferably about 5 to about 15 amperes, for a period of time sufficient to pass therethrough at least about 25 coulombs per liter of solution, and preferably at least about 50 coulombs per liter of solution. Usually about 300 coulombs per liter of aqueous sodium chloride solution represents a practical upper limit inasmuch as additional current passage confers little, if any, further benefit.

Aqueous edible chloride salt solutions useful in the preparation of ground meat products may also contain a variety of ingredients including buffering and polyvalent pickling agents such as various carbonate and phosphate salts, like sodium bicarbonate, sodium hexametaphosphate and sodium pyrophosphate. When buffering agents are present, the hereinabove described characterizations of the duration of electrolysis are useful methods for determining the duration of the current passage. However, when there is substantially no buffering capacity in the aqueous edible chloride salt solution, as in a solution of tap water saturated with sodium chloride, the third criterion for the duration direct electric current passage may be used. By this criterion, direct electric current may be passed through the aqueous solution until the pH of the resulting electrolyzed moisturizing solution has at least a value of about 8. In more preferred practice, passage of the direct current (electrolysis) is continued until a pH value of about 8.5 to about 10.5 for the electrolyzed moisturizing solution is achieved.

An aqueous solution of edible chloride salt normally has a near neutral pH value. For example, the aqueous sodium chloride solution may have a pH value of about 6.5 to about 7.7, prior to the passage of current therethrough when prepared from City of Chicago tap water.

The rise in pH value for the electrolyzed moisturizing solution is only temporary, and the electrolyzed moisturizing solution should be used while the pH value thereof remains elevated. For example, for a City of Chicago tap water solution containing about 3.8% by weight sodium chloride, the pH value begins to fall back towards its original value about 15 minutes after the direct current passing therethrough is shut off. This solution reverts to near its original pH value after about 40 minutes from the time the direct current is shut off.

Use of deionized, distilled or deionized-distilled water allows maintenance of an elevated pH value for a somewhat longer period of time. Thus, the electrolyzed moisturizing solution should be cooled to a temperature of no more than about 30° F., after passage of the electric current causes, to maintain the desired elevated pH value of the electrolyzed moisturizing solution, and that solution's moisturizing activity.

When the electrolyzed moisturizing solution comprises only a portion of the total composition used for moisturizing the meat, the above moisturizing activity criteria also apply. Thus, the direct current is passed through the aqueous solution of edible chloride salt so that when the electrolyzed solution is combined with another non-electrolyzed aqueous solution to form a resulting electrolyzed moisturizing solution, an average of at least about 25 coulombs per liter would have passed through the resulting electrolyzed solution. For example, if 100 coulombs of direct current were passed through one liter of aqueous edible chloride salt solution, and that electrolyzed solution were mixed with three liters of a non-electrolyzed solution, 100 coulombs of direct current would have passed through the resulting four liters, or an average of about 25 coulombs of direct current per liter would have passed.

When using the pH value of the electrolyzed solution as a criterion, the pH value of the resulting electrolyzed moisturizing solution should be at least about 8. Thus, the aqueous edible salt solution may be electrolyzed to a first pH value, and a second aqueous solution mixed therewith so that the resulting electrolyzed solution has a pH value of at least about 8. A direct correlation for all water supplies is not possible for determining to what pH value the electrolyzed solution should be elevated prior to adding the second solution. However, that value may be readily obtained for a given water supply by a few simple experiments.

Some experimentation may also be needed when using the performance criterion for a resulting electrolyzed moisturizing solution prepared from an electrolyzed aqueous edible chloride salt solution and a non-electrolyzed solution. Nevertheless, the aforedescribed performance criterion should also be met when using a resulting electrolyzed moisturizing solution prepared from an electrolyzed and non-electrolyzed solution.

Cooling of the electrolyzed moisturizing solution to form the before described moisturizing composition helps to maintain the elevated pH value, and effectiveness of the composition. The electrolyzed moisturizing composition (cooled electrolyzed moisturizing solution) is then contacted with the meat chunks while maintaining its moisturizing activity. For example, using the pH value criterion, the meat is contacted with the electrolyzed moisturizing composition having a pH value of at least about 8.

Thus, the aqueous, edible chloride solution is electrolyzed until its pH value is at least about 8, and is preferably about 8.5 to about 10.5, and the electrolyzed moisturizing composition is utilized while its pH value is at least about 8, and is preferably about 8.5 to about 10.5.

When a comminuted, particulate solid moisturizing composition is utilized, its pH value is measured by allowing a portion to melt, and measuring the pH value of the melted composition. Measurement of pH values for the slurry or slush, or completely melted moisturizing composition may be made in the usual manner.

Using a performance criterion, it is preferred that the electrolyzed moisturizing composition be combined with the meat chunks while at least about one-half by weight of the moisturizing composition, when combined with the meat chunks at about 3% by weight of the meat chunks, is retained after the meat chunks are ground. Stating this criterion in a slightly different manner, the meat chunks and electrolyzed moisturizing composition are combined to form an admixture while at least about one-half of the moisturizing composition is retained by meat chunks after grinding when that composition is combined with the meat chunks before grinding in an amount of 3 percent by weight thereof. More preferably, the electrolyzed moisturizing composition is combined with the meat chunks while about 60% to about 80% by weight, and most preferably more than about 80% by weight of the combined, moisturizing composition is, when combined with the meat chunks at about 3% by weight of the meat chunks, retained after the meat chunks are ground.

To reiterate the use of the performance criterion, the aqueous, edible chloride solution may be electrolyzed until at least about one-half by weight of the resulting electrolyzed moisturizing solution, when combined with meat chunks at about 3% by weight of the meat chunks, is retained after the meat chunks are ground. In more preferred practice, the electrolysis is continued until about 60% to about 80% by weight is retained after grinding. The electrolyzed moisturizing composition is utilized while it has similar performance characteristics.

As stated hereinbefore, the electrolyzed moisturizing composition need not comprise all of the water and edible chloride used in the moisturizing process. However, when the non-electrolyzed aqueous composition is utilized as part of the composition used to moisture the meat, the total aqueous composition utilized to contact the meat should meet the abovedescribed criteria for the electrolyzed moisturizing composition as was beforedescribed for the electrolyzed moisturizing solution or resulting moisturizing solution.

Electrodes for use in the present process may be selected from a wide variety of conductive materials such as carbon, graphite, silver, or stainless steel, or the like. In one suitable arrangement, a stainless steel pan containing the edible chloride salt solution may be used as the anode while a carbon electrode suspended within the solution in the pan may be the cathode; alternatively the pan may be made the cathode and the carbon electrode the anode. It is also preferred that the electrodes be relatively inert during electrolysis, and be relatively non-consumable.

To prepare a ground meat product of this embodiment, the meat chunks, the electrolyzed moisturizing composition of, for instance, tap water and edible chloride salt and further ice particles (when used) are combined together to form an admixture. A conventional mixing means such as a paddle mixer or ribber mixer or the like, as are known in the industry, may be used. The admixture is agitated until at least a portion of the moisturizing composition is taken up or sorbed by the meat chunks to form moisturized meat chunks. For example, this take-up takes less than about 1 minute and frequently less than about ½ minute of agitation time for an aqueous solution containing 3% water and 0.1% sodium chloride, both based on the total weight of meat supplied.

The word "sorb" as used herein in its various grammatical forms is meant to include both the terms "absorb" and "adsorb". The words "take-up", "sorb" and the concept of "meat penetration" of and by the electrolyzed moisturizing compositions are all used herein to describe the same phenomenon.

When making ground meats having a high fat content, such as the common 60 weight-% lean—40 weight-% fat pork sausage, it is preferred to first combine leaner meat chunks, such as those containing no more than about 8% to about 10% fat by weight and termed in the art as super lean, with the electrolyzed moisturizing composition and agitate the admixture. Once the moisturizing composition has penetrated the meat that is present, a second supply of meat chunks having a higher fat content by weight may be admixed therewith to form a second meat chunk admixture.

After all of the meat and moisturizing composition have been admixed, the admixture, whether moisturized meat chunks or second meat chunk admixture, is ground to form a product. It is found when the process of this invention is followed in the production of 60 weight-% lean—40 weight-% fat pork sausages using an electrolyzed moisturizing composition containing sodium chloride at 0.1% by weight of the meat chunks admixed with meat chunks at about 3% by weight of those meat chunks, that little or no water is lost during the grinding step, thus demonstrating shrinkage reduction during processing. This is contrary to the usual occurrence when this type of sausage is made with the same weight of moisturizing water and sodium chloride per pound of meat as the electrolyzed moisturizing composition herein.

In another embodiment of this process, the combining of the meat chunks with the electrolyzed moisturizing composition to form an admixture, the agitation of the admixture to form moisturized meat chunks and the grinding of the moisturized meat chunks may all be carried out substantially together. For example, the meat chunks may be placed into a grinder and the moisturizing composition added during the grinding step so that the moisturizing composition is admixed, agitated with and sorbed or taken up by the meat while the meat is being comminuted and mixed within the grinder.

After grinding, the ground product is recovered. If sausages are made, the ground meat is stuffed into sausage casings, such as those made from processed collagen or fibrous cellulose derivatives as are well known in the art, and the stuffed casings are bound or knotted to form sausage links or large sausages, as is also known in the art.

Ground meat products used in sausages also usually contain added spices. In preferred practice herein, spices are added to the meat prior to the grinding step as this helps assure a uniform distribution of the spices.

The ground meat prepared in accordance with this invention may be marketed in a pre-cooked state; i.e., sausages may be at least partially cooked prior to sale, as is the situation for the sausages of the Examples hereinbelow. The process steps used in the preparation of a pre-cooked, ground meat product may be similar to those for a fresh, ground meat product with the addition of cooking and possibly packaging steps.

Cured meat is prepared in another embodiment of the process of this invention. Pork is again used as exemplary of meat.

In the curing arts, the aqueous edible chloride salt-containing solution used in preparing cured meats is called a pickle or aqueous pickle solution. In this embodiment, the aqueous pickle solution contains at least about 0.4 molal edible chloride salt such as sodium chloride. In more preferred practice, the edible chloride salt is used at a concentration of about 0.6 molal to about 1.5 molal. The upper limit for the concentration of edible chloride salt is saturation of the aqueous pickle solution.

The aqueous pickle solutions of the present invention may also contain polyvalent pickling and buffering agents. Use of these agents tends to raise the cost of the product and make the electrolyzed moisturizing solution more difficult to freeze. These materials include inorganic phosphate salts such as sodium tripolyphosphate, sodium pyrophosphate, sodium hexametaphosphate, sodium mono- and dibasic phosphates and the like. Additional agents such as citric acid or its sodium salts, or sodium carbonate or bicarbonate, glutamic acid and its salts, the salts of ethylenediamine tetraacetic acid, and the like may be present. Spices, gums, smoke flavorants such as wood distillates, and the like, as are well known in the meat curing art, may also comprise the aqueous pickle solutions of this invention.

In most preferred practice, the aqueous pickle solutions of the present invention contain no added phosphates, carbonates or other polyvalent pickling agents; i.e. the most preferred aqueous pickle solutions are substantially free of polyvalent pickling agents, or buffers. Rather, the most preferred aqueous pickle solutions comprise water (usually tap water), an edible chloride salt, such as sodium chloride, as well as sodium nitrate and/or sodium nitrite and sugars such as sucrose or corn syrup; i.e. those materials normally found in an aqueous pickle solution other than the polyvalent buffering and pickling agents such as phosphate or carbonate salts or the like.

In addition to the above-mentioned aqueous pickle solution components, aqueous pickle solutions of this invention may also contain edible acids and bases to control the pH value of the composition. These edible acids and bases include hydrochloric acid, acetic acid, sodium hydroxide and the like. Of course, the above-mentioned, or similar, phosphate salts and citric acid and its mono-, di- and trisodium salts may also be used to assist in controlling the pH value of the aqueous pickle solution.

Except for the before discussed concentrations of edible chloride salt, particular pickle solutions formulations are not a feature of this invention.

In preferred practice, the aqueous pickle solution has a pH value of about 8 to about 11. When phosphate salts or other polyvalent pickling agents are present in the aqueous pickle solution, the preferred pH value of the aqueous pickle solution is about 9.5 to about 10.5. In more preferred practice, where the aqueous pickle solution is substantially free of these buffering agents, (has about the buffering capacity of a solution of tap water saturated with sodium chloride) the pH value of the electrolyzed, moisturizing composition, as used to contact meat for curing, is at least about 8, and still more preferably is about 8.5 to about 10.5.

Meat to be cured is contacted with the aqueous pickle solution for a time sufficient to effect cure, as is well known in the art. However, prior to such contacting, the aqueous pickle solution is formed into an electrolyzed moisturizing pickle solution of this invention having moisturizing activity by passing a direct electric current of about 2 to about 20 amperes, and preferably about 3 to about 8 amperes therethrough for a period of time sufficient to pass at least about 25 coulombs per liter of solution. Preferably, at least about 50 coulombs per liter of aqueous pickle solution are passed therethrough. It is found that the voltage values at which the direct electric currents is passed may vary over a considerable range, presumably depending upon the amount of electrolyte present in particular aqueous pickle solutions, and the range of usually observed voltages is that stated hereinbefore.

The aqueous pickle solutions are preferably electrolyzed at the beforedescribed edible chloride salt concentrations for this embodiment, although electrolysis at one concentration may be followed by adjustment of that concentration as was previously discussed. For example, a more concentrated sodium chloride solution may be electrolyzed at the abovedescribed number of coulombs per liter of pickle, and the concentration of sodium chloride and other aqueous pickle solution ingredients then adjusted as desired. Regardless of the edible chloride salt concentration during electrolysis, when used to contact meat for curing, the electrolyzed, moisturizing pickle composition (below) contains at least about 0.4 molal edible chloride salt, and preferably about 0.6 molal to about 1.5 molal edible chloride salt.

The electrolyzed moisturizing pickle solution is cooled to a temperature of no more than about 30° F. while the solution maintains moisturizing activity to form the electrolyzed, moisturizing pickle composition. As previously discussed, cooling is usually effected within about 40 minutes after passage of the direct current through the electrolyzed, moisturizing pickle solution has ceased so as to maintain the solution's moisturizing activity. The electrolyzed, moisturizing pickle composition is then preferably frozen to form an electrolyzed, moisturizing pickle composition which is at least partially solid. Meat to be cured is thereafter contacted with the electrolyzed, moisturizing composition while it retains moisturizing activity as will be discussed in greater detail hereinafter.

When the aqueous, moisturizing pickle solution is substantially free of polyvalent pickling and buffering agents, it may be electrolyzed, as described above, or the direct current passed therethrough until the pH value of the electrolyzed, moisturizing pickle solution is at least about 8, and preferablly is about 8.5 to about 10.5. This electrolyzed, moisturizing pickle solution is then cooled to a temperature of no more than about 30° F., and is preferably frozen to form the electrolyzed, moisturizing pickle composition which is at least partially solid, while the electrolyzed, moisturizing pickle composition has a pH value of at least about 8, and preferably has a pH value of about 8.5 to about 10.5, i.e., maintains moisturizing activity. This step is then followed by contacting meat to be cured with the electrolyzed, moisturizing pickle composition.

As was described for the electrolyzed moisturizing solution and composition, the electrolyzed, moisturizing pickle solution, and electrolyzed, moisturizing pickle composition, as used to contact the meat for curing, may be comprised in part of non-electrolyzed compositions. When so comprised, the resulting pickle composition has moisturizing activity, when it contacts the meat for curing and thus meets the aforedescribed moisturizing activity criteria.

Contacting of the meat and electrolyzed, moisturizing pickle composition may be effected in various ways as discussed hereinbefore. In most preferred practice, the meat is contacted with the electrolyzed, moisturizing pickle composition by injecting the composition into the meat through a plurality of hollow needles. When using this technique, the electrolyzed, moisturizing pickle composition which usually exudes from the meat after injection and that which normally drips from the injection needles is recycled for injection into other pieces of meat. The meat may also be injected with the electrolyzed, moisturizing pickle composition more than one time.

Initially solid, or slurry or slush forms of the electrolyzed, moisturizing pickle composition may be utilized in the curing of meat as when the meat is bathed in the electrolyzed, moisturizing pickle composition. A melted, liquid form of the electrolyzed, moisturizing pickle composition is preferred for use in curing when the only source of pickle injected into the meat is the electrolyzed, moisturizing pickle composition, as that form may be most readily injected into the meat. When using the melted form of the electrolyzed, moisturizing pickle composition, it should be used while it retains its moisturizing activity, as discussed above, such as while the pH value of the melted liquid having the buffering capacity substantially that of a tapwater solution saturated with sodium chloride is at least about 8, or more preferably while the pH value is about 8.5 to about 10.5. The pH value and moisturizing activity of melted, electrolyzed, moisturizing composition may also be maintained at its elevated level by passage of a direct current therethrough at a lowered amperage of about 0.5 to about 2 amperes as is discussed in my copending patent application Ser. No. 165,850, filed on July 7, 1980.

The solid form of electrolyzed, moisturizing pickle solution may also be used for curing meats. As an example of how this may be done, a non-electrolyzed phosphate-containing pickle solution was placed in a first reservoir of an apparatus for injecting pickle solution into meat. A frozen, electrolyzed moisturizing composition also containing phosphate ions was placed in a second reservoir of the apparatus. Pickle for injecting into the meat was taken from the first reservoir and injected into the meat. Excess pickle exuded from the meat and was returned to the first reservoir for reuse after passing over and contacting the frozen, electrolyzed, moisturizing composition in the second reservoir, thereby melting a portion of that frozen composition and admixing the melted portion with the excess pickle to form a resulting pickle composition.

The resulting pickle composition so formed was then injected into the meat with excess resulting pickle composition, which exudes from the meat, being reused. The resulting pickle composition was then formed by contacting the excess (reused) resulting composition with the frozen, electrolyzed moisturizing pickle composition thereby melting a portion thereof and admixing the melted portion with the excess resulting pickle composition to form said resulting pickle composition. Additional non-electrolyzed pickle was also added to the first reservoir to constitute the remainder of the pickle taken up by the meat so that after the pickle-injecting operation was running, about 75 percent by weight of the resulting pickle being injected into the meat was non-electrolyzed, while about 25 percent by weight was from the electrolyzed, moisturizing pickle composition.

Several advantages were noted from this manner of operation. Included in these advantages are the facts that (1) the desired high pH value of the injected pickle (above about pH 9.5) was maintained for a longer period of time than was the case when only non-electrolyzed pickle was used; (2) the concentration of salts in the injected pickle was also maintained at a suitable level; and (3) the temperature of the injected pickle was lower than that usually used so as to retard possible meat spoilage prior to effecting a cure in the neat.

Several means for passing direct electric current through an aqueous solution are useful in the present invention, and some of these have been previously discussed. For example, the aqueous pickle solution may be placed into a stainless steel bucket, the bucket itself used as one electrode, such as the cathode, while another electrode, made from silver, graphite or other suitable material, is placed within the solution in the bucket as the anode. Applying direct electric current to these electrodes at a voltage sufficient to produce the before described amperage and pass the number of coulombs per liter of pickle solution or raise the pH value thereof to at least about 8 then results in the formation of the electrolyzed, moisturizing pickle solution utilized herein.

It is understood in the present embodiment and in all of the previously discussed embodiments of this invention that while only two electrodes are mentioned, they are illustrative of the minimal requirement for electrodes, namely, a positive and negative electrode. Thus, in actual practice, a plurality of physical objects may correspond to each of the electrodes (cathode and anode) discussed herein.

Regardless of the method of preparing the electrolyzed, moisturizing pickle solution and electrolyzed, moisturizing pickle composition, once the electrolyzed, moisturizing pickle composition is formed, treatment of the meat takes place by first contacting the meat to be cured with the electrolyzed, moisturizing pickle composition. The meat and electrolyzed, moisturizing pickle composition are thereafter maintained in contact for a period of time sufficient to effect curing of the meat, and thereby produce moisturized, cured meat; i.e., meat having a moisture content enhanced over that moisture content naturally present, and which is also cured. The time to effect curing of the meat is, among others, a function of the particular pickle solution, curing temperature and the meat being cured, and all of this is known in the art.

When using the most preferred method of contacting the meat and electrolyzed, moisturizing pickle composition by injection of the pickle into the meat through hollow needles, it is of course understood that the needles normally do not remain within the meat except during the injection period, nor is the pickle solution continually injected into the meat. Rather, in usual practice, the needles pierce a portion of the meat, electrolyzed, moisturizing pickle composition is injected into the meat therethrough, the needles are retracted from the meat, and then pierce the same piece of meat at a different position, or pierce a new piece of meat, and the steps repeated. To increase the amount of pickle composition within the meat, each piece of meat may be injected on more than one occasion.

The term "solution" is used herein to include true solutions, dispersions and mixtures of ingredients as are known in the art and to be useful for treating meats.

The amounts of various additives described and utilized herein are used only in an illustrative manner to demonstrate the advantages and benefits of this invention. The examples set forth hereinbelow illustrate the present invention further.

Example 1: Pre-Cooked, Smoked Pork Sausage

Pork sausages which are pre-cooked and smoked prior to sale were prepared. These sausages contained 60 weight percent lean and 40 weight percent fat prior to cooking. Batches of aqueous solution prepared from 30 pounds of water, one pound of sodium chloride and 72 grams of sucrose were electrolyzed using a current of 4.5 amperes at 3 volts for 5 minutes (110 coulombs/liter of solution). The pH of the solution rose from 7.5 to 10.5 at the completion of the electrolysis. The electrolyzed moisturizing solution batches were then quickly placed into plastic liners, placed in boxes and frozen into blocks in a blast freezer at a temperature of $-20°$ F. and whose air movement was about 10,000 c.f.m.

A sufficient number of the frozen blocks were ground into particles and the particles allowed to melt into a slurry of solid and liquid weighing 1092 pounds. This slurry, at a temperature of 22-26° F., was then combined with a total of 9935 pounds of pork chunks so that the weight of the slurry was 11% of the weight of the pork chunks. The slurry was first combined and admixed with about 1190 pounds of super lean (9 weight percent fat) pork chunks to moisturize them. The remaining, approximately 8745 pounds of pork chunks having the necessary lean and fat content to prepare a 60 percent lean, uncooked sausage were thereafter added and admixed. After admixture of the pork chunks and slurry, and agitation of the admixture, the moisturized pork chunks were ground and stuffed into fibrous casings pierced with holes (3.25 inch diameter and 28 inches long) to make sausages. Thereafter, the sausages were cooked and smoked to an internal temperature of 150° F.

After cooling, the cooked, smoked sausages weighed 9603 pounds, for a total processing and cooking shrink of about 3.3 percent, or yield of about 96.7 percent. This yield is comparable to that obtained when the electrolyzed moisturizing solution is not frozen prior to admixture with the pork chunks (96 percent yield as shown in Example 2 of my application Ser. No. 165,850, filed on July 7, 1980) and vastly superior to the prior, usual yield of about 75 percent obtained when similar amounts of pork and nonelectrolyzed moisturizing solution are used.

Example 2: Pre-Cooked, Smoked Pork Sausage

In another experiment, 993 pounds of pork chunks similar to those of Example 1 were admixed and agitated with 11% of their weight of a slurry formed of solid and melted, previously frozen electrolyzed moisturizing solution identical to that used in Example 1. In this instance, after grinding, the ground pork was stuffed into fibrous casings with pierced holes (1.625 inch diameters and 28 inches long) and cooked and smoked as also described in Example 1. Here, after cooling the product weighed 1053 pounds for for a yield of 106 percent based upon the original pork chunks' weight.

Example 3: Pre-Cooked "Italian Sausage"

In this instance, 100 pounds of 75 weight percent lean and 25 weight percent fat pork chunks were treated in an analogous manner through the grinding step to the pork of the previous Examples. After grinding, the ground product was placed into 36 millimeter diameter edible collagen casings and formed into 6 inch links. The links were placed end-to-end in stainless steel baskets, and cooked and smoked to an internal temperature of 150° F. On cooling, 95 pounds of product were obtained, representing a yield of 95 percent based upon the pork chunks's original weight. When this product is prepared using non-electrolyzed salt solutions, the yield is normally about 70-88 percent.

What is claimed is:

1. A process for preparing a meat product with reduced shrinkage comprising the steps of:
providing meat;
providing an aqueous solution containing an edible chloride salt present at a concentration of at least about 0.2 molal;
passing a direct electric current through said aqueous solution to form an electrolyzed moisturizing solution having moisturizing activity, said current passing through said aqueous solution at about 2 to about 20 amperes;
cooling said electrolyzed moisturizing solution to a temperature of no higher than about 30° F., after passage of said direct electric current through said electrolyzed moisturizing solution has ceased, while maintaining said moisturizing activity to form an electrolyzed moisturizing composition;
thereafter combining said meat and said electrolyzed moisturizing composition to contact said meat with said electrolyzed moisturizing composition to form an admixture;
maintaining said contact for a time period sufficient for said electrolyzed moisturizing composition to penetrate said meat and enhance the moistuure content thereof to form moisturized meat; and
recovering said moisturized meat.

2. The process of claim 1 wherein said meat is in the form of chunks.

3. The process of claim 2 including the steps of agitating said admixture; and grinding the recovered meat chunks.

4. The process of claim 2 wherein said aqueous solution has a buffering capacity substantially that of tap water saturated with sodium chloride.

5. The process of claim 4 wherein said direct electric current is passed through said aqueous solution for a time sufficient to raise the pH value of said aqueous solution to at least about 8 while forming said electrolyzed moisturizing solution.

6. The process of claim 5 wherein said meat chunks and electrolyzed moisturizing composition are combined while the pH value of said electrolyzed moisturizing composition is at least about 8.

7. The process of claim 1 wherein said electrolyzed moisturizing composition is:
(a) solid; or
(b) a slurry of solid and liquid; or
(c) a liquid formed from the melting of said electrolyzed moisturizing composition of (a) of (b).

8. The process of claim 7 wherein an additional amount of a non-electrolyzed aqueous composition is added to the meat in said combining step.

9. The process of claim 1 wherein said direct electric current is passed through said solution until at least about 25 coulombs have passed therethrough per liter of said aqueous solution.

10. The process of claim 1 wherein said edible chloride salt is present in a concentration of at least about 0.4 molal and said electrolyzed moisturizing composition and said meat are maintained in contact for a time sufficient to cure said meat.

11. The process of claim 1 wherein an additional amount of a non-electrolyzed aqueous composition is added to the meat in said combining step.

12. The process of claim 1 wherein said meat is the flesh of mammals.

13. The process of claim 12 wherein said meat is pork.

14. The process of claim 12 wherein said meat is beef.

15. A process for preparing ground meat comprising the steps of:
providing meat chunks;
providing an aqueous, edible chloride salt-containing solution, said salt being present at a concentration of at least 0.2 molal;
passing a direct electric current of about 5 to about 15 amperes through said aqueous solution to form an electrolyzed moisturizing solution;
freezing said electrolyzed moisturizing solution to form an electrolyzed moisturizing composition which is at least partially solid;
thereafter combining said meat and said electrolyzed moisturizing composition to contact said meat with said electrolyzed moisturizing composition to form an admixture, said electrolyzed moisturizing composition that is combined with said meat being:
(a) solid; or
(b) a slurry of solid and liquid; or
(c) a liquid formed from the melting of said electrolyzed moisturizing composition of (a) or (b);
agitating said admixture until at least a portion of said electrolyzed moisturizing composition is taken up by said meat chunks to enhance the moisture content thereof and form moisturized meat chunks;
grinding said moisturized meat chunks to form a ground product; and
recovering said ground product.

16. The process of claim 15 wherein said edible chloride salt is calcium chloride and is present in said aqueous solution at a concentration of about 0.2 molal to a saturated solution.

17. A process for preparing ground meat comprising the steps of:
providing meat chunks;
providing an aqueous solution containing an edible chloride salt present at a concentration of at least about 0.2 molal;
passing a direct electric current of about 5 to about 15 amperes through said aqueous solution for a time sufficient to raise the pH value of the aqueous solution to at least about 8 to thereby form an electrolyzed moisturizing solution;
freezing said electrolyzed moisturizing solution to form an electrolyzed moisturizing composition which is at least partially solid while said solution has a pH value of at least about 8;
thereafter combining said meat chunks and said electrolyzed moisturizing composition to form an admixture while the pH value of said electrolyzed moisturizing composition is at least about 8;
agitating said admixture until at least a portion of said electrolyzed moisturizing composition is taken up by said meat chunks to enhance the moisture content thereof and form moisturized meat chunks;
grinding said moisturized meat chunks to form a ground product; and
recovering said ground product.

18. The process of claim 17 wherein said edible chloride salt is sodium chloride and is present in an amount of about 0.1 percent by weight of the total weight of meat supplied.

19. The process of claim 17 wherein said edible chloride salt is present in said aqueous solution at a concentration of about 0.25 to about 1.25 molal.

20. The process of claim 17 wherein said edible chloride salt is calcium chloride.

21. The process of claim 17 wherein said direct electric current is passed through said aqueous solution at about 5 to about 10 amperes.

22. The process of claim 17 additionally comprising the steps of admixing additional meat chunks with said moisturized meat chunks prior to said grinding step to form a meat chunk admixture, said additional meat chunks containing more fat than said moisturized meat chunks.

23. The process of claim 17 wherein said combining step, said agitating step and said grinding step are carried out substantially simultaneously.

24. The process of claim 17 wherein said direct current is passed through said aqueous solution until the pH value of said electrolyzed moisturizing solution is about 8.5 to about 10.5.

25. A process for preparing ground meat comprising the steps of:
providing first meat chunks;
providing an aqueous solution containing sodium chloride at a concentration of about 0.25 molal to about 1.25 molal;
passing a direct electric current of about 5 to about 10 amperes through said aqueous solution for a time sufficient to produce an electrolyzed moisturizing solution having a pH value of about 8.5 to about 10.5;
freezing said electrolyzed moisturizing solution to form an electrolyzed moisturizing composition which is at least partially solid while said electrolyzed moisturizing solution has a pH valve of about 8.5 to about 10.5;
thereafter combining said first meat chunks and said electrolyzed moisturizing composition to form an admixture while the pH value of said electrolyzed moisturizing solution is not less than about 8.5;
agitating said admixture until at least a portion of said electroyzed moisturizing composition is taken up by said meat chunks to enhance the moisture content thereof and form moisturized meat chunks;
providing second meat chunks containing a higher fat content than said first meat chunks;
admixing said second meat chunks with said moisturized meat chunks to form a meat chunk admixture;
grinding said second meat chunk admixture to form a ground product; and
recovering said ground product.

26. The process of claim 25 wherein said electrolyzed moisturizing composition is a particulate solid when combined with said meat chunks.

27. The process of claim 25 wherein said meat chunks are the flesh of mammals.

28. The process of claim 27 wherein said meat chunks are pork.

29. The process of claim 27 wherein said meat chunks are beef.

30. The process of claim 25 comprising the additional steps of adding spices to said meat chunk admixture prior to said grinding step, stuffing said ground product into sausage casings, and binding said stuffed casings to form sausages.

31. The process of claim 30 including the further step of at least partially cooking the formed sausages.

32. A process for preparing ground meat comprising the steps of:
providing meat chunks;
providing an aqueous solution containing sodium chloride present at a concentration of at least about 0.2 molal;
passing a direct electrical current of about 1 to about 20 volts and about 2 to about 20 amperes through said solution for a time period sufficient to pass at least about 25 coulombs per liter of said aqueous solution therethrough to produce an electrolyzed moisturizing solution having moisturizing activity;
freezing said electrolyzed moisturizing solution to form an electrolyzed moisturizing composition which is a first slurry of solid and liquid while maintaining said moisturizing activity;
thereafter combining said electrolyzed moisturizing composition as said first slurry of solid and liquid and said meat chunks to form an admixture while said slurry has moisturizing activity;
agitating said admixture until at least a portion of said slurry is taken up by said meat chunks to enhance the moisture content thereof and form moisturized meat chunks;
grinding said admixture to form a ground product; and
recovering said ground product.

33. The process of claim 32 wherein said direct current is passed through said solution until at least 50 coulombs per liter of said solution have passed therethrough.

34. The process of claim 32 wherein an additional aqueous composition is admixed with said first slurry, prior to said combining step, to form a second slurry, said second slurry having moisturizing activity.

35. The process of claim 34 wherein said first slurry comprises at least about 25 weight percent of said second slurry.

36. A process for curing meat comprising the steps of:
providing an aqueous pickle solution containing an edible chloride salt present at a concentration of at least about 0.4 molal;
passing a direct electric current of about 2 to about 20 amperes through said aqueous pickle solution to form an electrolyzed, moisturizing pickle solution having moisturizing activity, said current passing therethrough until at least about 25 coulombs have passed through per liter of said solution;
cooling said electrolyzed, moisturizing pickle solution to a temperature of no higher than about 30° F., after passage of said direct electric current through said electrolyzed, moisturizing pickle solution has ceased, while maintaining said moisturizing activity to form an electrolyzed, moisturizing pickle composition which is at least partially solid;
thereafter contacting meat to be cured with said electrolyzed, moisturizing pickle composition, said electrolyzed, moisturizing pickle composition that contacts said meat being:
(a) solid; or
(b) a slurry of solid and liquid; or
(c) a liquid formed from the melting of said electrolyzed, moisturizing pickle composition of (a) or (b), while maintaining said moisturizing activity;
maintaining said contacting for a sufficient time to cure said meat; and
recovering said cured meat.

37. The process of claim 36 wherein said electrolyzed, moisturizing pickle composition contains about 0.6 molal to about 1.5 molal edible chloride salt when contacting said meat to be cured.

38. The process of claim 36 wherein said edible chloride salt is sodium chloride.

39. The process of claim 36 wherein at least about 50 coulombs of direct electric current are passed through per liter of said aqueous pickle solution.

40. The process of claim 36 wherein said meat to be cured is contacted with said electrolyzed, moisturizing pickle composition by injecting said electrolyzed, moisturizing pickle composition into said meat.

41. The process of claim 36 wherein said meat to be cured is the flesh of mammals.

42. The process of claim 41 wherein said flesh of mammals is pork.

43. The process of claim 41 wherein said flesh of mammals is beef.

44. A process for curing meat comprising the steps of:
providing an aqueous pickle solution containing sodium chloride present at about 0.6 molal to about 1.5 molal, said pickle solution having the buffering capacity substantially that of a tap water solution saturated with sodium chloride;
passing a direct electric current through said pickle solution at about 2 to about 20 amperes to form an electrolyzed, moisturizing pickle solution, the current being passed through said pickle solution until the pH value of said electrolyzed, moisturizing pickle solution is at least about 8;
freezing said electrolyzed, moisturizing pickle solution to form an electrolyzed, moisturizing pickle composition which is a slurry of solid and liquid while said electrolyzed, moisturizing pickle solution has a pH value of at least about 8;
thereafter contacting meat to be cured with said electrolyzed, moisturizing pickle composition, said electrolyzed, moisturizing pickle composition being:
(a) a slurry of solid and liquid; or
(b) a liquid formed from the melting of said electrolyzed, moisturizing pickle composition of (a) and used while the pH value of said liquid is at least about 8;
maintaining said contacting for a time sufficient to cure said meat; and
recovering said cured meat.

45. The process of claim 44 wherein said meat to be cured is contacted with said electrolyzed, moisturizing pickle composition by injecting said pickle composition into said meat.

46. The process of claim 45 wherein the pH value of said electrolyzed, moisturizing pickle composition when injected is about 8.5 to about 10.5.

47. The process of claim 44 wherein said direct electric current is passed at about 3 to about 8 amperes.

48. A process for curing meat comprising the steps of:
providing an aqueous pickle solution containing sodium chloride present at about 0.6 molal to about 1.5 molal;
passing at least about 50 coulombs of direct electric current per liter of said pickle solution therethrough at about 3 to about 8 amperes to form an electrolyzed, moisturizing pickle solution having moisturizing activity;
cooling said electrolyzed, moisturizing pickle solution, while maintaining said moisturizing activity, to a temperature of no higher than about 30° F., after passage of said direct electric current through said electrolyzed, moisturizing pickle solution has ceased, to form an electrolyzed, moisturizing pickle composition which is at least partially solid;
thereafter contacting meat to be cured with said electrolyzed, moisturizing pickle composition by injecting at least a portion of said electrolyzed, moisturizing pickle composition in liquid form into said meat, said electrolyzed pickle composition being a liquid formed from the melting of said at least partially solid, electrolyzed, moisturizing composition, and being used while maintaining said moisturizing activity;
maintaining said contact for a time sufficient to form cured meat; and
recovering said cured meat.

49. The process of claim 48 wherein an excess of said electrolyzed, moisturizing pickle composition is injected into said meat, subsequently recovered, and then recycled for injection into said meat.

50. The process of claim 48 wherein further direct current is passed through said, melted electrolyzed, moisturizing pickle composition at about 0.5 to about 2 amperes until said electrolyzed, moisturizing pickle solution is injected.

51. A process for curing meat comprising the steps of:
providing an aqueous pickle composition containing sodium chloride present at about 0.6 molal to about 1.5 molal;
passing at least about 50 coulombs of direct electric current per liter of said pickle solution therethrough at about 3 to about 8 amperes to form an electrolyzed, moisturizing pickle solution having moisturizing activity;
thereafter freezing said electrolyzed moisturizing pickle solution into a solid, frozen electrolyzed, moisturizing pickle composition while maintaining said moisturizing activity;
providing a supply of non-electrolyzed pickle solution;
admixing said frozen electrolyzed, moisturizing pickle composition and said non-electrolyzed pickle solution thereby melting a portion of said frozen, electrolyzed moisturizing pickle composition to form a resulting pickle composition;
contacting meat to be cured with said resulting pickle composition;
maintaining said contact for a time sufficient to form cured meat; and
recovering said cured meat.

52. The process of claim 51 wherein said non-electrolyzed pickle solution contains polyvalent pickling and buffering agents.

53. The process of claim 51 wherein said electrolyzed, moisturizing pickle composition is present in an amount of at least about 25 weight percent in said resulting pickle composition.

54. The process of claim 51 wherein said resulting pickle composition contacts said meat by injecting said resulting composition into said meat, and excess resulting composition which exudes from the meat is reused.

55. The process of claim 54 wherein said resulting pickle composition is formed by contacting the excess resulting composition with said frozen, electrolyzed moisturizing pickle composition thereby melting a portion thereof and admixing said melted portion with the excess resulting composition to form said resulting pickle composition.

* * * * *